United States Patent [19]
Kujath

[11] 3,913,012
[45] Oct. 14, 1975

[54] MICROWAVE MOISTURE MEASURING SYSTEM WITH REFLECTION SUPPRESSING MEANS

[75] Inventor: Klaus Kujath, Erlangen, Germany

[73] Assignee: Frieseke & Hoepfner GmbH, Erlangen, Germany

[22] Filed: Feb. 22, 1974

[21] Appl. No.: 444,715

[30] Foreign Application Priority Data
Feb. 24, 1973 Germany.............................. 2309278

[52] U.S. Cl............................................. 324/58.5 A
[51] Int. Cl.²........................................ G01R 27/04
[58] Field of Search..... 324/58.5 A, 58.5 B, 58.5 R, 324/58 A, 58 B

[56] References Cited
UNITED STATES PATENTS
3,644,826 2/1972 Cornetet, Jr................... 324/58.5 A
FOREIGN PATENTS OR APPLICATIONS
897,956 6/1962 United Kingdom............ 324/58.5 A Primary Examiner—Stanley T. Krawczewicz
Attorney, Agent, or Firm—Karl F. Ross; Herbert Dubno

[57] ABSTRACT

The microwave absorbtivity of a workpiece, which is proportional to the moisture content thereof, is measured by transmitting a beam of microwave radiation from a sending (radiating or transmitting) antenna on one side of the workpiece at a right angle through the workpiece to a receiving antenna on the other side of the workpiece. This beam is received at the other side of the workpiece and an output is generated which corresponds to the intensity of radiation received. Radiation reflected by the workpiece back into the sending antenna (backscatter) is detected at the sending antenna and another output is generated which corresponds to the intensity of microwave radiation reflected back into this antenna. The reflection of microwave radiation from either antenna to the other antenna and any internal reflection of microwave radiation in the transmitting antenna are suppressed in this system so as to eliminate standing waves.

5 Claims, 1 Drawing Figure

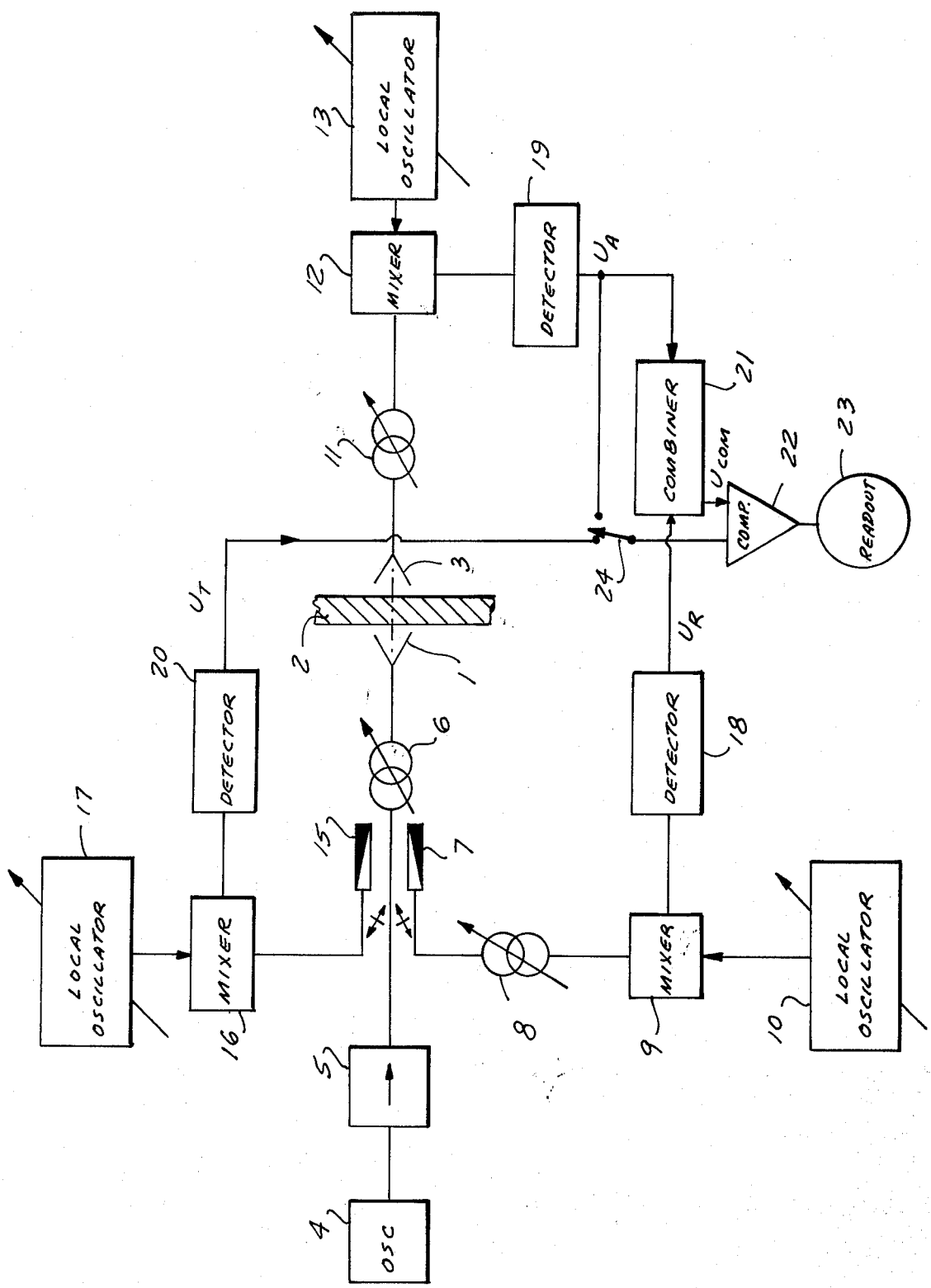

MICROWAVE MOISTURE MEASURING SYSTEM WITH REFLECTION SUPPRESSING MEANS

FIELD OF THE INVENTION

The present invention relates to a microwave measuring system and, more particularly, to a microwave measuring system and method for determining the moisture content in a continuously moving web or mass of material.

BACKGROUND OF THE INVENTION

There have been heretofore two principal microwave measuring techniques. One uses a pair of antennas to either side of the workpiece. Microwave energy is transmitted from one antenna to the other so that the difference between the intensity or amplitude of microwave energy received and the amount of microwave energy transmitted by the respective antennas is equal to the energy absorbed by the workpiece. The moisture content is generally proportional to the energy absorbed.

In another technique, sending and receiving antennas are arranged on the same side of the workpiece. The energy is reflected from the sending antenna off the workpiece into the receiving antenna, the relative energy levels and the phase shift between sending and receiving antennas indicating various characteristics of the workpiece.

A composite system has been proposed wherein three antennas are used concurrently. Two of the antennas are receiving antennas and are arranged to either side of the workpiece. The third antenna is a sending antenna and is directed at an angle to the workpiece surface, so that its energy is partially reflected and partially transmitted by the workpiece. The intensity of energy reflected or scattered is detected on the same side of the workpiece as that at which the sender is disposed and is used to correct the readings of the receiver on the other side of the workpiece, since without this reflected-energy correction the scattered energy reflected would be included in the energy difference as though it had been absorbed by moisture in the workpiece, and the mositure reading would be, therefore, correspondingly false.

Orientation of the antennas or one of them at an angle relative to the workpiece surface or the mass whose moisture content is to be determined, causes a phase shift between the received microwave and the transmitted wave. This phase shift is increasingly greater with thicker workpieces and higher moisture content and can be relatively large. This difference is also affected by the sending and receiving antennas so that the wave relationships have the characteristics of a Bessel function whereby the system will have a nonlinear output. The reflected energy as it is received is similarly inaccurate. Because of the angled position of the scatter or reflected energy antenna only a portion of the scattered or reflected microwave energy is received. This is due to the fact that the scattered or reflected microwave energy is reflected at both the obverse and reverse faces of the workpiece so that two phase-shifted reflected signals are received and because the scattered radiation is not confined to the solid angle intercepted by the reflection antenna. Thus with relatively large workpiece thicknesses and relative low moisture contents the factor of error will be large.

A further problem with such arrangements is that standing waves are established which tend to falsify many of the readings.

OBJECTS OF THE INVENTION

It is therefore an object of the present invention to provide an improved microwave-measuring system.

Another object of this invention is the provision of an improved method of and apparatus for measuring moisture content in a moving web workpiece with microwave energy.

A further object of this invention is the provision of such a system which overcomes the above-given disadvantages, that is which gives relatively accurate results and is relatively inexpensive to manufacture and operate.

SUMMARY OF THE INVENTION

The above objects are attained, according to the present invention, in a system in which the beam of microwave energy is transmitted through the flat workpiece at right angles thereto. Reflective or backscattered microwave energy is picked up at the sending side of the workpiece through the sending antenna and an output signal corresponding to the strength of the reflected radiation is formed. The energy transmitted through the workpiece to the receiving antenna is detected and an output is generated which corresponds to the signal strength at this side. These two outputs are then combined so as to give a reading corresponding to the microwave energy absorbed by the flat workpiece between the two antennas.

In accordance with surface features of this invention the measuring device is adjusted so as to completely eliminate the inner reflection of the transmitted energy in the wave guide to the transmitting antenna, the reflection of microwave energy from the receiving antenna toward the transmitting antenna, and the reflection of microwave energy from the sending antenna to the receiving antenna. The device has therefore no standing waves which can in any way detrimentally influence the accuracy of the readout. This suppression allows the obtention of extremely accurate measuring results, much more precise than any other hitherto obtainable, and which are independent of workpiece thickness and position.

In accordance with further features of this invention the sending assembly comprises a power oscillator connected through a tunable wave guide to a horn antenna. This sending guide is connected to a directional coupler only responding to radiation reflected back into the horn antenna and itself connected through an adjustable wave guide to a detector. The receiver comprises another horn antenna of the tunable type connected to its own detector. Both of the detectors are connected to sources of a reference signal which energize them for highest output. The output of these two detectors are fed to a comparator which may also have an input connected to another directional coupler on the transmitting wave guide which detects the level of energy transmitted. The three signals are combined by subtracting the sum of the signal picked up by the receiver and the signal picked up by the reflection receiver from the signal transmitted, this difference corresponds to the amount of microwave radiation absorbed by the workpiece.

Thus it is essential to the present invention that the reflected microwave energy (i.e., backscatter in the direction opposite to the incidence direction) from the workpiece (preferably a web of more or less uniform thickness—e.g., paper or fabric—, or a mass of other material on a belt) is collected by the same antenna (i.e., the transmitting, radiating or sending antenna) from which the incident microwave energy is directed at a right angle to the web or material transport path.

A system for obtaining a corrected output using incident, scattered and transmitted microwave energy is described in U.S. Pat. No. 3,644,826.

BRIEF DESCRIPTION OF THE DRAWING

The above and other objects, features, and advantages will become more readily apparent from the following description, reference being made to the accompanying drawing whose sole FIGURE is a schematic representation of the system according to the present invention.

SPECIFIC DESCRIPTION

The arrangement according to this invention has a pair of microwave antenna horns 1 and 3 facing each other at right angles across a workpiece 2. The antenna 1 is energized by a power oscillator 4 through a wave guide 5 adjustable as shown schematically at 6. A first directional coupler 7 adjustable as shown at 8 is connected to a mixer 9 and is adapted to receiver radiation reflected back into the horn antenna 1.

A second directional coupler 15 carried on the transmitting wave guide 5 is connected to a mixer 16 and is adapted to detect the level of microwave radiation transmitted out of the horn 1. The receiving horn 3 is adjustable as shown at 11 and is connected to its own mixer 12.

The mixers 9, 16, and 12 are connected to respective variable local oscillators 10, 17, and 13, and are connected through respective detectors 18, 20, and 19, so as to produce respective outputs $U_R$, $U_T$, and $U_A$. The outputs $U_R$ and $U_A$ are fed to a combiner 21 having an output connected to the input of a comparator 22 whose other input receives the output $U_T$. A readout 23 at the output side of this comparator 22 indicates the microwave absorbtivity of the workpiece 2 and, therefore, the moisture content thereof (see U.S. Pat. No. 3,644,826).

The device operates as follows: The horn 1 is energized by the power oscillator 4 so as to form a beam indicated at 14 which passes at right angles through the planar workpiece 2. This beam is partially absorbed by moisture in this workpiece 2, is partially reflected, and is partially transmitted through the workpiece to the horn 3. That portion which is transmitted through the horn 3 is transformed into output $U_A$. That portion which is reflected back is picked up by directional coupler 7 and transformed into output $U_R$. These two outputs are combined so as to form a third output $U_{COM}$ indicating that radiation which was transmitted through the workpiece 2 and that radiation which was reflected by the workpiece 2. The output $U_T$ indicating the forward-going radiation in the wave guide 6 is proportional to the amount of radiation transmitted so that the difference between the amount transmitted $U_T$ and the amount $U_{COM}$ which passes through the workpiece 2 or was reflected thereby is transformed by the comparator into an output which can be read at 23. This output is proportional to the amount of microwave radiation absorbed by the workpiece 2, and therefore is proportional to the amount of moisture in this workpiece. The mixers have quadratic characteristic input/output curves so that their outputs can be maximized by adjustment of the respective oscillators. It should also be noted that with a given reflectivity of the workpiece 2 it is possible simply to compare the output $U_R$ indicating reflected microwave energy and $U_A$ indicating the amount of energy transmitted through the workpiece. The ratio of these two corresponding mathematically to the amount of microwave energy absorbed. This switchover can be carried out by an SPDT switch 24 which connects the other input of the comparator 22 either to the line carrying output signal $U_T$ or directly to the line carrying the output $U_A$.

The device is adjusted and set up as follows:

First a so-called "total absorber" is placed between the horns 1 and 3 in the position shown for the workpiece 2. This total absorber completely eliminates the possibility of any microwave energy being reflected back into the horn 1. In this position first the local oscillator 10 is adjusted to raise the output $U_R$ to a maximum, then the adjustment elements 6, be they pins, apertures, or the like, are operated so as to drop this output $U_R$ to zero. This completely eliminates any internal reflection in the wave guide 5. At the same time the local oscillator 17 is adjusted to raise output $U_T$ to a maximum.

Thereupon the total absorber in the position of the workpiece 2 is moved out from between the two horns 1 and 3. The output $U_R$ will therefore indicate that amount of microwave energy which is reflected back into the horn 1 by the horn 3. The oscillator 13 and the adjustment 11 are operated so as to reduce the output $U_R$ to zero, by tuning the output horn 3 so as to absorb all of the microwave radiation transmitted into it as shown at 14 by the horn 1.

A workpiece 2 is now placed between the two horns 1 and 2. It is still possible for a standing wave to be formed between the horns 1 and 3 as a result of microwave energy being reflected by transmitting horn 1 into the receiving horn 3. To eliminate this the adjustment 8 is operated so that any microwave radiation reflected by the workpiece 2 back into the horn 1 will be picked up by this horn 1 and not just reflected back out toward the horn 3. The workpiece 2 is moved between the horns 1 and 3 and the adjustment 8 is varied until the output $U_R$ varies minimally.

Once the apparatus has been set up in this manner it is possible to use the above-described device to measure the moisture content of a rapidly moving web, such as textiles in a treatment plant. The output of the system gives a very accurate representation of just how much moisture or other microwave absorbers are present in the web.

The device measures both the radiation reflected by the workpiece and the radiation transmitted through the workpiece, so that it is easy to calculate from the amount originally transmitted at the workpiece how much has been absorbed thereby.

I claim:

1. A method of measuring the microwave absorptivity of a flat workpiece comprising the steps of:
    transmitting a beam of microwave radiation from a
    sending antenna on one side of said workpiece at a right angle through said workpiece to a receiving antenna on the other side thereof;

receiving said beam at said receiving antenna and generating an output corresponding to the intensity of microwave radiation received;

detecting through said sending antenna microwave radiation reflected by said workpiece back from said beam and generating an output corresponding to the intensity of reflected microwave radiation detected;

suppressing the reflection of microwave radiation from each of said antennas to the other antenna and internal reflections of microwave radiation in said sending antenna; and combining said outputs for determination of the portion of microwave energy absorbed by said workpiece.

2. The method defined in claim 1 wherein the reflection of microwave radiation from said receiving antenna to the sending antenna is suppressed by adjusting said receiving antenna in the absence of a workpiece between said antennas until said output corresponding to reflected radiation is substantially null.

3. The method defined in claim 1 wherein the reflection of microwave radiation from said sending antenna toward said receiving antenna is suppressed by adjusting a directional coupler on said sending antenna serving to detect said reflected radiation.

4. The method defined in claim 1 wherein the internal reflections of microwave radiation in said sending antenna are suppressed by adjusting the waveguide for said sending antenna.

5. An apparatus for measuring the microwave absorptivity of a flat workpiece, said apparatus comprising:

a sending antenna on one side of said workpiece and trained at a right angle thereto;

a receiving antenna on the other side of said workpiece in line with said sending antenna;

means connected to said sending antenna for transmitting a beam of microwave radiation therefrom through said workpiece at a right angle thereto to said receiving antenna;

means at said receiving antenna for receiving said beam and generating an output corresponding to the intensity of microwave radiation received;

means at said sending antenna for detecting microwave radiation reflected back by said workpiece into said sending antenna and for generating an output corresponding to the intensity of reflected microwave radiation;

means connected to said means at said antennas for combining said outputs;

first means connected to said receiving antenna for suppressing the reflection of microwave radiation from said receiving antenna back to said sending antenna;

second means connected to said sending antenna for suppressing the reflection of microwave radiation from said antenna back to said receiving antenna; and third means at said sending antenna for suppressing the internal reflection therein of microwave radiation.

* * * * *